July 11, 1967   E. J. KLEIN   3,330,107
FORM OF LINK FOR USE AS A SHACKLE
Filed July 30, 1964
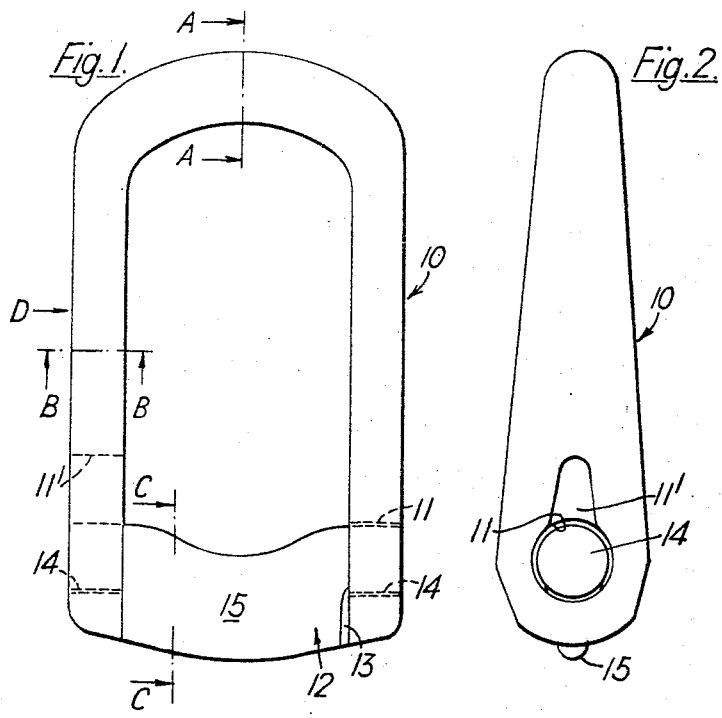
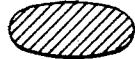
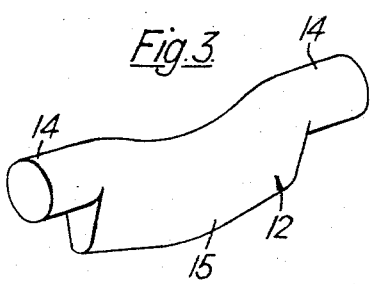
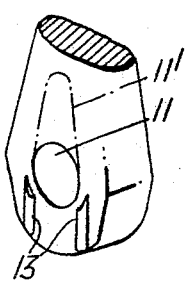
*Inventor*
ENRIQUE JORGE KLEIN
By Mason, Fenwick & Lawrence
*Attorneys*

United States Patent Office 3,330,107
Patented July 11, 1967

3,330,107
FORM OF LINK FOR USE AS A SHACKLE
Enrique Jorge Klein, Valparaiso, Chile
(2597 Alpine Road, Menlo Park, Calif. 94025)
Filed July 30, 1964, Ser. No. 386,358
Claims priority, application Great Britain, Aug. 14, 1963,
32,037/63
4 Claims. (Cl. 59—86)

This invention relates to an improved form of link for use as a shackle.

When it is desired to join together two lengths of rope, chain, cable or the like it is usual to employ a link, or shackle, to do so. The most common form of shackle comprises a substantially U-shaped member, the legs of which are provided, near the open end of the U with holes to accommodate a pin which passes through both legs and closes the open end. The end links of the two parts of chain to be joined are positioned in the U-shaped member and the pin is fitted through the holes in the legs of said member. The pin is usually in the form of a bolt such that it can be secured in position by screwing a nut on to the threaded end protruding from the leg of the U-shaped member and as this may take some time to do, suggestions have been made to improve shackles such that they can be put into use relatively quickly. From these suggestions various types of "snap" shackles have been evolved. In the main, shackles of this type incorporate a pin which is hinged or some way attached to the end of one leg of the U-shaped member and fixed in position to the other end by some form of spring device.

This form of shackle has certain disadvantages, one being that the mechanical parts are prone to failure and are more expensive to manufacture, and another being that the hinged, or fixed, pins tend to obstruct the chains being positioned in the shackle.

It is the object of the present invention to overcome or mitigate these disadvantages.

According to the present invention there is provided a link comprising a main body in the form of an open-ended loop, and a pin adapted to be removably journalled between the legs of the main body to close the loop, a portion of the pin being arranged, when the loop is closed by the pin, to interlock against an inside face of at least one leg of the main body to prevent the pin rotating relative to the legs of the main body.

Preferably a pair of spaced protuberances are provided on the said inside face of the leg, the aforesaid portion of the pin seating between these protuberances to prevent rotation of the pin, when the pin is fitted to the main body.

Preferably also the middle portion of the side of the pin upon which a load is carried, is arched away from the closed end of the loop forming the main body when the pin is interlocked on the main body.

One embodiment of the present invention will now be described merely by way of example with reference to the accompanying drawings in which:

FIG. 1 is a front elevation of an assembled link,
FIG. 2 is an end elevation of the assembled link looking in the direction of arrow D in FIG. 1,
FIG. 3 is a perspective view of the pin,
FIG. 4 is a perspective view of part of one leg of the body showing the locking means for the pin.
FIGS. 5, 6 and 7 are sections through the assembled link shown in FIG. 1 at AA, BB and CC respectively.

FIG. 1 shows the open-ended loop 10 forming the main body of a link provided with a hole 11, 11' near the end of each leg, in which the pin 12 closing the link can journal. Of the holes 11, 11' which are basically round, one 11' has an additional slot, narrower than the diameter of the hole, extending towards the closed side of the loop to permit the introduction of the pin 12 from outside the body. A pair of spaced small protuberances 13 are provided on the inside face of one leg of the body, running between the hole and the lower edge of the leg, which serve to lock the pin in position as will be described. These protuberances could be provided on the respective inside face or faces of either or both the legs of the body.

The pin has round sections 14 on each extremity, which are adapted to make a sliding fit in the two holes 11 of the main body 10 of the link. The portion of the pin 12 between the two round extremities 14 is substantially of round cross section with a narrower rib 15 jutting out of the round section.

The assembly of the link is carried out by introducing the pin 12 with its rib 15 facing the closed end of the loop, through the hole 11' with extended slot in the respective leg of the main body until its forward end seats in the hole 11 of the opposite leg. The pin 12 is then rotated through half a turn to its working position where the rib 15 faces away from the closed end of the loop and the outside contour of the link becomes continuous around its entire perimeter. During the final part of this rotation one end of the rib 15 abuts against one of the protuberances 13 on the inside face of the respective leg of the main body, and upon continued forced rotation of the pin 12, the legs of the body are sprung apart slightly until the rib has run over the protuberance 13. Through the spring action of the loop, the legs spring back to lock the rib 15 of the pin 12 between the two protuberances 13 impeding any further rotation. The same procedure in reverse applies for disassembly. No special tools are required for the assembly or disassembly of the link.

The middle part of the pin 12, on the side on which the load is carried, is arched away from the closed end of the loop when in its working position, thus to ensure that loads on the pin are self-centering. The arched pin 12 also prevents the link from possible disassembly when under load.

The parts of this link may be made by cold forging and may be of galvanized steel or any other suitable material.

In us, for example to interconnect two wire ropes each terminating in a hard eye, one hard eye would be ringed over a leg of the loop and the pin would go through the other hard eye while assembling the link.

As a result of the present invention a link for use as a shackle has been provided which is simple and relatively cheap to manufacture, the link is suitable for manufacture by cold forging, and is simple and involves a minimum of time to operate.

I claim:
1. A link comprising a main body in the form of an open-ended loop, at least the legs of the open-ended loop resiliently resisting forces which tend to alter the separation of the legs from each other beyond that of their normal spacing, a pin adapted to be removably journalled between the legs of the main body to close the loop, an enlarged central portion of the pin being arranged, when the loop is closed by the pin, to interlock the pin with its enlarged portion against an inside face of at least one leg through the resiliency of the main body to prevent the pin rotating relative to the legs of the main body.

2. A link as claimed in claim 1 in which a pair of protuberances are provided on the said inside face of the leg the aforesaid enlarged portion of the pin seating between these protuberances to prevent rotation of the pin, when the pin is fitted to the main body.

3. A link as claimed in claim 1 in which the middle of the pin, upon which a load is carried, is arched away from the closed end of the loop forming the main body when the pin is interlocked on the main body.

4. A link as claimed in claim 1 in which said main body is in the form of an open-ended loop in which the two legs can be elastically sprung apart for a small displacement of the ends of said legs; said two legs containing substantially cylindrical openings in which said pin is removably journalled, one of said openings being defined further by an extension into that leg to permit the introduction of said pin therethrough, the other leg being provided with a pair of protuberances on said inside face of said other leg; said pin including cylindrical sections at its ends and a substantially cylindrical middle portion with a rib jutting therefrom, said middle portion being arched in the direction of said rib; said two cylindrical sections of said pin journalling freely in said openings of said legs and one end of said rib abutting against one of said protuberances on said inside face of said leg when said link is being assembled or disassembled, and said end of said rib being locked between said protuberances when in working position to prevent rotation of said pin and accidental disassembly.

References Cited

UNITED STATES PATENTS

| | | | |
|---|---|---|---|
| 809,511 | 1/1906 | Lien | 59—86 |
| 1,016,183 | 1/1912 | Sweeney | 59—86 |
| 1,030,527 | 6/1912 | Nelson | 59—86 |
| 1,121,865 | 12/1914 | Pitt | 59—86 |
| 2,259,217 | 10/1941 | Stevenson | 59—86 |
| 2,259,880 | 10/1941 | Ehmann | 59—86 |
| 2,616,747 | 11/1952 | Ratigan | 59—86 |

CHARLES W. LANHAM, *Primary Examiner.*

G. P. CROSBY, *Assistant Examiner.*